(12) United States Patent
Nakazato

(10) Patent No.: US 6,728,957 B1
(45) Date of Patent: Apr. 27, 2004

(54) PROGRAM RESPONSE TIME ESTIMATING APPARATUS

(75) Inventor: Hidenori Nakazato, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/531,965

(22) Filed: Mar. 21, 2000

(30) Foreign Application Priority Data

Mar. 26, 1999 (JP) .......................................... 11-084044

(51) Int. Cl.[7] .................................................. G06F 9/00
(52) U.S. Cl. ........................ 718/100; 718/102; 718/107
(58) Field of Search .................... 709/1–108; 718/1–108

(56) References Cited

U.S. PATENT DOCUMENTS

| | | | | |
|---|---|---|---|---|
| 3,648,253 A | * | 3/1972 | Mullery et al. | 709/100 |
| 5,887,143 A | * | 3/1999 | Saito et al. | 709/248 |
| 5,978,832 A | * | 11/1999 | Sirkin | 709/107 |
| 6,003,061 A | * | 12/1999 | Jones et al. | 709/104 |
| 6,026,391 A | * | 2/2000 | Osborn et al. | 707/2 |
| 6,026,425 A | * | 2/2000 | Suguri et al. | 709/105 |
| 6,269,274 B1 | * | 7/2001 | Steinman et al. | 700/28 |
| 6,317,774 B1 | * | 11/2001 | Jones et al. | 709/107 |

FOREIGN PATENT DOCUMENTS

JP  95931  4/1994

OTHER PUBLICATIONS

Patent Abstracts of Japan.
C. L. Liu and James W. Layland, "Scheduling Algorithms for Multiprogramming in a Hard–Real–Time Environment," *Journal of the Association for Computing Machinery*, Vol, 20, No. 1, Jan. 1973, pp. 44–61.

* cited by examiner

*Primary Examiner*—Majid A. Banankhah
*Assistant Examiner*—Syed Ali
(74) *Attorney, Agent, or Firm*—Venable LLP; Michael A. Sartori; Daniel G. Vivarelli

(57) ABSTRACT

In a system in which a plurality of programs each enter an execution wait state at a given time point and they are sequentially executed in the order of their cutoff times, the execution completion time point of a program undergoing estimation of execution completion thereof is estimated based upon the average value of intervals representing the lengths of time to elapse before an execution request for a program present in the system arrives, the average value of the execution times of the individual programs in the system, the lengths of time to elapse between the execution request arrival time points and the cutoff times, the execution time of the program undergoing estimation of execution completion thereof and the execution request arrival time point of the program undergoing estimation of the execution completion thereof, thus achieving a structure that enables estimation of the response time of a program without necessitating a lengthy process such as an actual or simulated execution of the program.

4 Claims, 6 Drawing Sheets

FIG.2

| Average Program Arrival Interval | Average Program Execution Time | Average Program Relative Cutoff Time |
|---|---|---|

FIG.4

| Average Program Arrival Interval | Average Program Execution Time | Relative Cutoff Time / Execution Time Ratio |

PROGRAM RESPONSE TIME ESTIMATING APPARATUS

BACKGROUND OF THE INVENTION

1. Field of the Invention

The present invention relates to a program response time estimating apparatus that estimates the length of time (response time) to elapse after a program enters an execution wait state until the execution is completed. In particular, it relates to a program response time estimating apparatus that may be employed in an information processing system with a plurality of executable programs present therein, in which each program enters an execution wait state at a given time point and the programs in an execution wait state are sequentially executed in the order of their cutoff times.

2. Description of the Related Art

In an information processing system or an information communication system, for instance, a plurality of executable programs may be present within the system. In such a case, the programs enter an execution wait state at various time points. Programs in an execution wait state are sequentially executed in the order they entered the execution wait state or in the order of their cutoff times Let us consider a system which sequentially executes programs in an execution wait state in the order of their cutoff times. Such a system is disclosed in, for instance, "Scheduling Algorithms for Multiprogramming in a Hard Real-time Environment," Journal of the Association for Computing Machinery, Vol. 30, No. 1, January 1973, pp.46–61, by C. L. Liu et al. In this type of system, a program is executed in advance to measure its response time for purposes of estimating the program response time. Alternatively, a program may be executed in a simulation by employing an apparatus such as that disclosed in Japanese Unexamined Patent Publication No. 1994- 95931 to obtain the program completion time point.

In addition, if it is known in advance that the intervals over which program execution requests are received or the program execution time conforms to a specific probability distribution function, and execution sequence control is implemented whereby programs are not executed in the order of their cutoff times but in the order in which they enter an execution wait state, for instance, the program response time can be estimated in correspondence to a parameter of the probability distribution function that expresses the interval upon which the program enters an execution wait state and the execution time.

Information processing systems include those with cutoff times set for program execution and those without any specific cutoff times. When a new program is to be added to a system of the former type, for instance, there is a need to verify in advance the length of time that the program requires to complete its processing.

In such a case, in a system adopting execution sequence control through which the programs are executed in the order of their cutoff times, a need exists to estimate an approximate if not perfectly accurate program response time. In order to meet this need, it is necessary to actually execute the program or simulate the program execution sequence based upon the numerical value representing the length of execution time to obtain the program response time. It takes a great deal of time to determine the response time through actual execution of the program or through simulation.

SUMMARY OF THE INVENTION

Accordingly, an object of the present invention is to provide a structure capable of estimating a response time of a program within a short period of time without having to actually execute the program or implement a simulation.

In order to achieve the object described above, the response time estimating apparatus according to the present invention constitutes a program response time estimating apparatus that is employed in a system with a plurality of programs present therein and estimates the response time of any of the programs. In the system, each program enters an execution wait state at a given time point. The system sequentially executes the programs in an execution wait state in the order of their cutoff times.

The response time estimating apparatus according to the present invention is provided with an average execution request arrival interval holding unit that holds an average interval after which a request to execute a program present within the system is received. The average interval after which a program execution request is received may be either provided by the system user each time or may be calculated by monitoring the individual programs with the average execution request arrival interval holding unit. In addition, when a new program is added to a system that is already in operation, the user or the average execution request arrival interval holding unit re-calculates an average interval after which an execution request is received with respect to all the programs in the system after the introduction of the new program based upon information on the added program and on the programs that are already operating in the system.

In addition, the response time estimating apparatus according to the present invention is provided with an average execution time holding unit that holds an average of the lengths of execution time of the programs present in the system. The response time estimating apparatus according to the present invention is further provided with an average relative cutoff time holding unit that holds a length of time to elapse after a request for execution of a program present in the system arrives until its cutoff time. The average execution time and the length of time to elapse after an execution request is received until the corresponding cutoff time may be also provided by the user or may be calculated by monitoring the individual programs with the average execution time holding unit. When a new program is added, the user or the average execution time holding unit re-calculates these values with respect to all the programs in the system after the introduction of the new program.

Furthermore, the response time estimating apparatus according to the present invention is provided with an estimation-undergoing program execution time holding unit and an estimation-undergoing program cutoff time holding unit, which respectively hold the length of execution time of a program whose execution completion time is to be estimated and the length of time to elapse between the execution request arrival time point and the cutoff time with respect to the program whose execution completion time is to be estimated.

By employing the individual means described above, the response time estimating apparatus according to the present invention estimates an execution completion time point for a program whose execution completion time is to be estimated.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings:

FIG. 2 illustrates information regarding background programs in the first embodiment;

FIG. 4 illustrates information regarding background programs in the second embodiment;

DETAILED DESCRIPTION OF THE PREFERRED EMBODIMENTS

Figure 1:
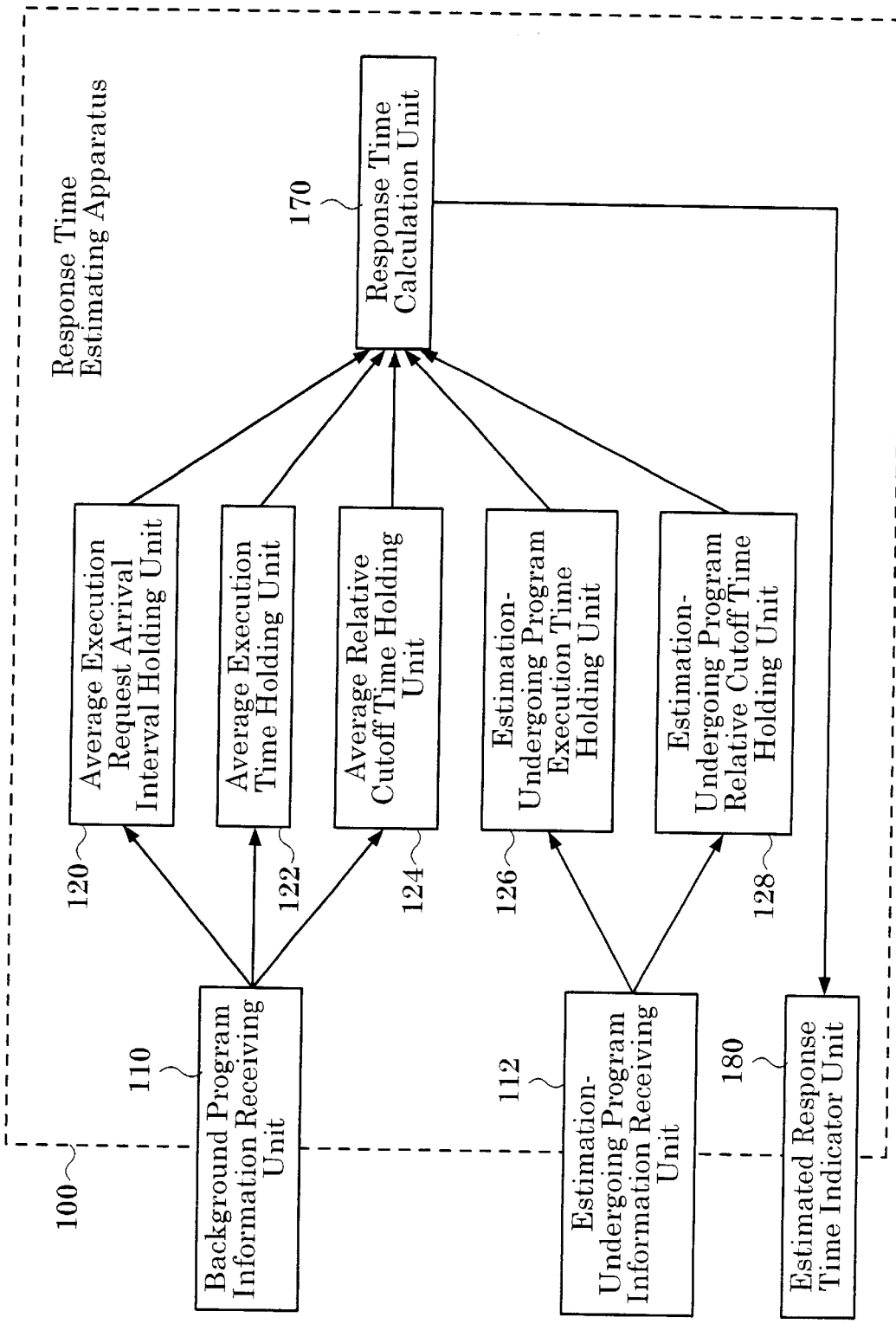
FIG. 1 is a block diagram of the program response time estimating apparatus in a first embodiment of the present invention.

The first embodiment of the present invention is now explained in reference to FIGS. 1 and 2. FIG. 1 is a block diagram of the program response time estimating apparatus in the first embodiment of the invention. The program response time estimating apparatus 100 adopting the present invention may be regarded as a functional block within a system having numerous programs present therein. In other words, the program response time estimating apparatus 100 may be realized as an independent hardware unit or as a program executed by a processor.

The program response time estimating apparatus 100 is provided to estimate the response time of a given program among a plurality of executable programs present within the system. Namely, it is an apparatus that estimates the length of time (response time) to elapse after a given program enters an execution wait state until the execution is completed in an environment in which the plurality of executable programs present in the system are sequentially executed in a single processor. It is to be noted that in the subsequent explanation, a specific program whose response time is to be estimated among the plurality of executable programs present within the system is referred to as an estimation-undergoing program. In addition, programs other than the estimation-undergoing program among the plurality of executable programs in the system are referred to as background programs.

The program response time estimating apparatus 100 is provided with a background program information receiving unit 110. The user of the program response time estimating apparatus 100 inputs information regarding the background programs to the background program information receiving unit 110. In other words, the background program information receiving unit 110 constitutes an interface for the user and the program response time estimating apparatus 100.

FIG. 2 presents the format of the background program information provided by the user to the background program information receiving unit 110. As shown in FIG. 2, the background program information includes an average program arrival interval, an average program execution time and an average program relative cutoff time.

The average program arrival interval is obtained as follows. Namely, for each of the background programs, the length of time to elapse between the current time point and the time point at which the background program enters an execution wait state is calculated. Then, the average value of these lengths of time is calculated. The average value thus obtained is referred to as the average program arrival interval.

Next, the average program execution time is obtained as follows. Namely, for each of the background programs, the length of time to elapse after the execution of the background program starts until the execution ends is calculated and the average value of these lengths of time is calculated. The average value thus obtained is referred to as the average program execution time.

The average program relative cutoff time is obtained as follows. Namely, for each of the background programs, the length of time (relative cutoff time) to elapse between the time point at which the background program enters an execution wait state and its cutoff time point. Then, the average value of these lengths of time is calculated. The average value thus obtained is referred to as the average program relative cutoff time.

An average execution request arrival interval holding unit 120, an average execution time holding unit 122 and an average relative cutoff time holding unit 124 are all connected to the background program information receiving unit 110.

The average execution request arrival interval holding unit 120 holds the average program arrival interval received by the background program information receiving unit 110 from the user. The average execution time holding unit 122 holds the average program execution time received by the background program information receiving unit 110 from the user. The average relative cutoff time holding unit 124 holds the average program relative cutoff time received by the background program information receiving unit 110 from the user.

The program response time estimating apparatus 100 is further provided with an estimation-undergoing program information receiving unit 112. The user of the program response time estimating apparatus 100 inputs information with respect to the estimation-undergoing program to the estimation-undergoing program information receiving unit 112. In other words, the estimation-undergoing program information receiving unit 112 constitutes an interface for the user and the program response time estimating apparatus 100.

The estimation-undergoing program information provided by the user to the estimation-undergoing program information receiving unit 112 includes the execution time and the relative cutoff time of the estimation-undergoing program. The execution time of the estimation-undergoing program in this context refers to the length of time to elapse after the execution of the estimation-undergoing program starts until the execution ends. The relative cutoff time refers to the relative cutoff time of the estimation-undergoing program.

An estimation-undergoing program execution time holding unit 126, and an estimation-undergoing program relative cutoff time holding unit 128 are connected to the estimation-undergoing program information receiving unit 112. The estimation-undergoing program execution time holding unit 126 holds the execution time of the estimation-undergoing program in the information received by the estimation-undergoing program information receiving unit 112 from the user. The estimation-undergoing program relative cutoff time holding unit 128 holds the relative cutoff time of the estimation-undergoing program in the information received by the estimation-undergoing program information receiving unit 112 from the user.

While the average execution request arrival interval holding unit 120, the average execution time holding unit 122, the average relative cutoff time holding unit 124, the estimation-undergoing program execution time holding unit 126 and the estimation-undergoing program relative cutoff time holding unit 128 are illustrated as independent blocks in FIG. 1, they may be realized as, for instance, storage areas provided in a single storage device.

A response time calculation unit 170 is connected to the average execution request arrival interval holding unit 120, the average execution time holding unit 122, the average relative cutoff time holding unit 124, the estimation-undergoing program execution time holding unit 126 and the estimation-undergoing program relative cutoff time holding unit 128. The response time calculation unit 170 calculates the response time of the estimation-undergoing program by using the information held at the individual holding units.

The response time calculated at the response time calculation unit 170 is provided to an estimated response time indicator unit 180. The estimated response time indicator unit 180 is an indicator device provided to indicate the estimation-undergoing program response time to the user.

The following is an explanation of the operation performed in the first embodiment. The user of the response time estimating apparatus 100 inputs the average program arrival interval, the average program execution time and the average program relative cutoff time in FIG. 2 to the background program information receiving unit 110. The average program arrival interval, the average program execution time and the average program relative cutoff time are calculated by the user in advance by a means such as a statistical means.

The average program arrival interval, the average program execution time and the average program relative cutoff time are respectively provided to the average execution request arrival interval holding unit 120, the average execution time holding unit 122 and the average relative cutoff time holding unit 124.

Next, the user inputs the execution time and the relative cutoff time of the estimation-undergoing program whose response time is to be estimated to the estimation-undergoing program information receiving unit 112. The execution time and the relative cutoff time of the estimation-undergoing program, too, are calculated by the user in advance by a statistical means or the like.

The execution time and the relative cutoff time of the estimation-undergoing program are respectively provided to the estimation-undergoing program execution time holding unit 126 and the estimation-undergoing program relative cutoff time holding unit 128.

The response time calculation unit 170 calculates the response time of the estimation-undergoing program through the method explained below. Namely, t represents the solution of the following expression (1), with mA representing the background program average arrival interval, mE representing the background program average execution time, mD representing the background program average relative cutoff time, x representing the estimation-undergoing program execution time and y representing the relative cutoff time of the estimation-undergoing program.

(Expression 1)

$$\left(1 - \frac{mE}{mA}\right)t - \frac{mE}{mA}e^{-y/mD}\{(y + 2mD)(1 - e^{t/mD}) + te^{t/mD}\} = x \quad (1)$$

Consequently, the response time of the estimation-undergoing program can be calculated through the following expression (2).
(Expression 2)

$$t + \frac{mE}{mA}\{mD - (mD + y)e^{-y/mD}\} \quad (2)$$

As explained above, the program response time estimating apparatus in the first embodiment is capable of estimating the response time of a program when execution sequence control through which programs are executed in the order of their cutoff times is implemented as long as the average value of the intervals after which the individual programs enter an execution wait state, the average value of the individual lengths of execution time and the average value of the relative cutoff times are known in advance and the execution time and the relative cutoff time of the program undergoing the estimation of its response time are also known in advance. The program response time estimating apparatus does not require an actual or simulated execution of the programs. Thus, when adding a new program to the system, for instance, the work can be carried out without requiring much time.

It is to be noted that the information provided to the background program information receiving unit 110 and the estimation-undergoing program information receiving unit 112 does not necessarily have to be obtained by the user in advance through statistical methods. For instance, the background program information receiving unit 110 may count the average program arrival interval, the average program execution time and the average program relative cutoff time of all the background programs, instead. In such a case, the background program information receiving unit 110 will need a timer for measuring lengths of time and a means for detection that monitors any changes in the statuses of the background programs (a shift to an execution wait state, an execution start, an execution end, etc.). It will be easy for persons skilled in the art to constitute such means by using a general purpose information processor.

In addition, the estimated response time indicator unit 180 may provide the estimated respect time to another functional block in the system as well as indicating the estimation-undergoing program response time to the user. In other words, persons skilled in the art will be capable of easily conceiving a structure in which the estimated response time indicator unit 180 provides the estimated response time to a control apparatus (not shown) of a higher order within the system so that the higher-order control apparatus implements control of the overall system based upon the estimated response time thus provided.

Figure 3:
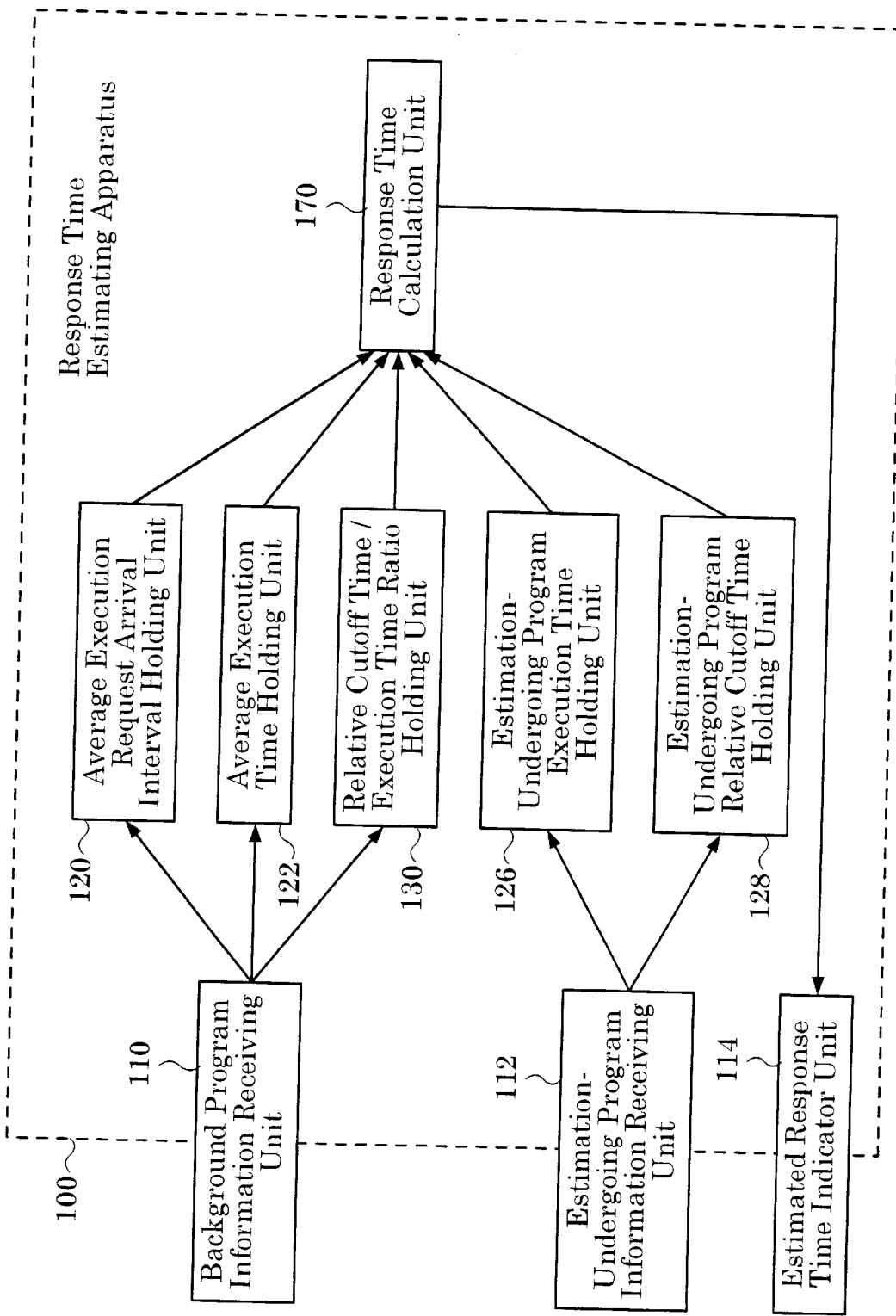
FIG. 3 is a block diagram of the program response time estimating apparatus in a second embodiment of the present invention.

Next, the second embodiment of the present invention is explained in reference to FIGS. 3 and 4. FIG. 3 is a block diagram of the program response time estimating apparatus in the second embodiment of the invention. In FIG. 3, the same reference numbers are assigned to components identical to those in the block diagram in FIG. 1 to preclude the necessity for repeated explanation thereof.

FIG. 4 illustrates the information provided by the user to the background program information receiving unit 110. Namely, the user provides the background program information receiving unit 110 with the relative cutoff time/ execution time ratio representing the average of the ratios of the relative cutoff times and the execution times of the individual background programs instead of the average program relative cutoff time in the first embodiment.

Now, in reference to FIG. 3, the difference between the first embodiment and the second embodiment is explained. The program response time estimating apparatus 100 in the second embodiment is provided with a relative cutoff time/ execution time ratio holding unit 130 instead of the average relative cutoff time holding unit 124. The relative cutoff time/execution time ratio holding unit 130 holds the relative cutoff time/execution time ratio provided by the user to the background program information receiving unit 110.

The following is an explanation of the operation performed in the second embodiment. The user of the response time estimating apparatus 100 inputs the program arrival interval, the average program execution time and the relative cutoff time/execution time ratio in FIG. 4 to the background program information receiving unit 110.

The average program arrival interval, the average program execution time and the relative cutoff time/execution time ratio are respectively provided to the average execution request arrival interval holding unit 120, the average execution time holding unit 122 and the average relative cutoff time/execution time ratio holding unit 130.

Next, the user inputs the execution time and the relative cutoff time of the estimation-undergoing program whose response time is to be estimated to the estimation-undergoing program information receiving unit 112.

The execution time and the relative cutoff time of the estimation-undergoing program are respectively provided to the estimation-undergoing program execution time holding unit 126 and the estimation-undergoing program relative cutoff time holding unit 128.

The response time calculation unit 170 calculates the response time of the estimation-undergoing program through the method explained below. Namely, t represents the solution of the following expression (3), with mA representing the background program average arrival interval, mE representing the background program average execution time, alpha representing the background program relative cutoff time/execution time ratio, x representing the estimation-undergoing program execution time and y representing the relative cutoff time of the estimation-undergoing program.
(Expression 3)

$$\left(1 - \frac{mE}{mA}\right)t - \frac{mE}{mA}e^{-Y/(\alpha mE)}\{(y + 2\alpha mE)(1 - e^{1/(\alpha mE)}) + te^{1/(\alpha mE)}\} = x \quad (3)$$

Consequently, the response time of the estimation-undergoing program can be calculated through the following expression (4).
(Expression 4)

$$t + \frac{mE}{mA}\{\alpha mE - (\alpha mE + y)e^{-y/(\alpha mE)}\} \quad (4)$$

As explained above, the program response time estimating apparatus in the second embodiment, too, is capable of estimating the response time of a program without having to actually execute the program or implement a simulation. Since the average value of the ratios of the relative cutoff times and the execution times is used in the process, a more accurate estimation is achieved compared to an apparatus that uses only the relative cutoff time as a parameter.

In the second embodiment, too, the background program information receiving unit 110 and the estimation-undergoing program information receiving unit 112 may monitor the background programs and the estimation-undergoing program respectively to obtain necessary information instead of providing information obtained by the user in advance through a statistical method to the background program information receiving unit 110 and the estimation-undergoing program information receiving unit 112 as explained earlier in reference to the first embodiment. In addition, as explained in reference to the first embodiment, the estimated response time indicator unit 180 may adopt a structure which enables it to provide the estimated response time to another functional block in the system as well as indicating the response time of the estimation-undergoing program to the user.

Figure 5:
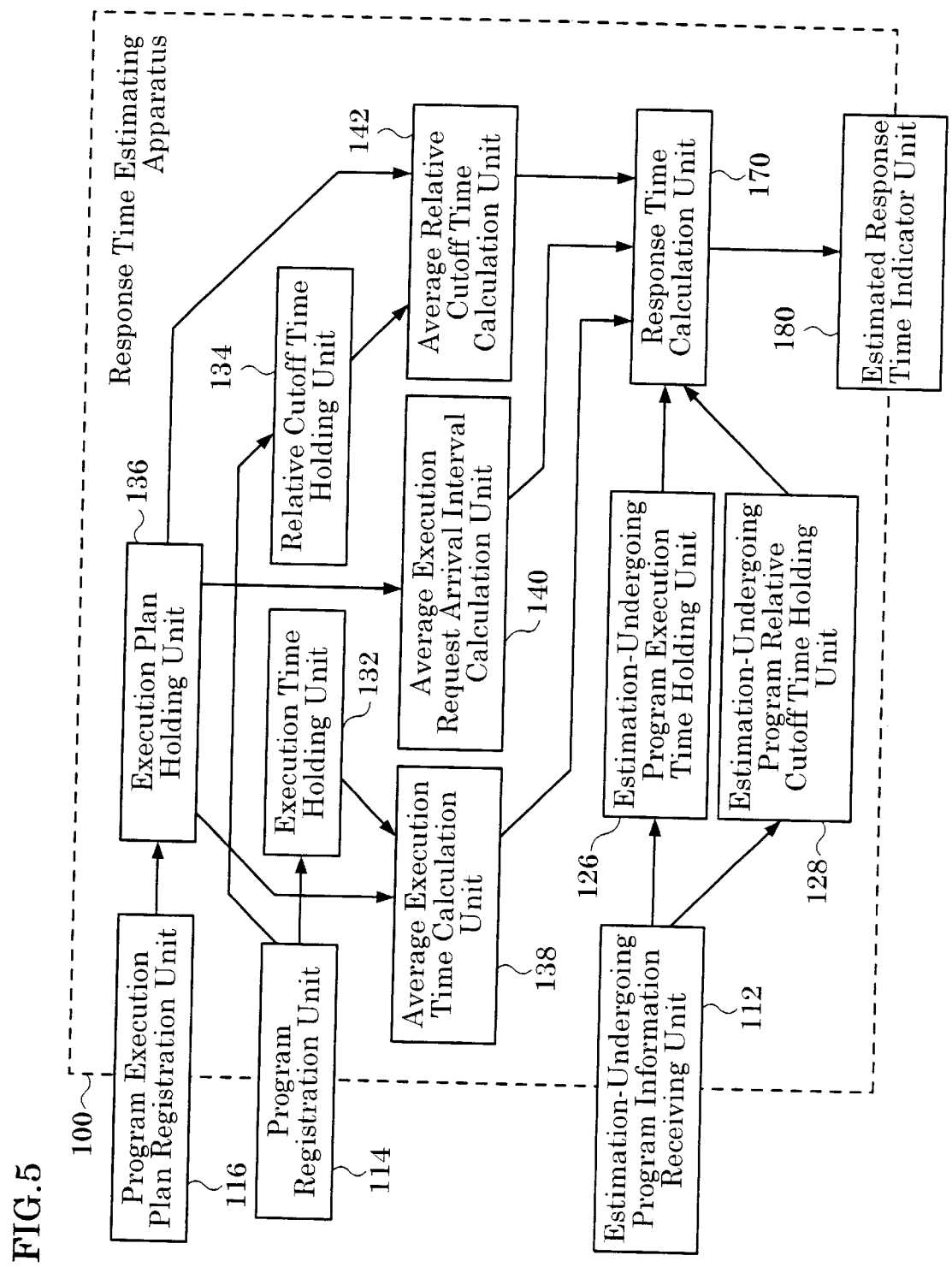
FIG. 5 is a block diagram of the program response time estimating apparatus in a third embodiment of the present invention.

Next, the third embodiment of the present invention is explained in reference to FIG. 5. FIG. 5 is a block diagram of the program response time estimating apparatus in the third embodiment of the invention. In FIG. 5, the same reference numbers are assigned to components identical to those in the block diagrams in FIG. 1 and FIG. 3 to preclude the necessity for repeated explanation thereof.

The third embodiment is effective when adding a new program into a system that is already in operation. Namely, in the first and second embodiments, the average program arrival interval, the average program execution time and the relative cutoff times are counted for the existing plurality of background programs each time. In contrast, in the third embodiment and also the fourth embodiment to be detailed later, when adding a new program into a system already in operation, the average program arrival interval, the average program execution time and the relative cutoff times of the background programs (a plurality of background programs) which are already operating are updated by using information on the new program to be added.

The program response time estimating apparatus 100 in the third embodiment is provided with a program registration unit 114. When adding a program into the system, the user registers the new program at the program registration unit 114. The specific contents of the information registered at the program registration unit 114 are the execution time and the relative cutoff time of the new program.

An execution time holding unit 132 is connected to the program registration unit 114. The execution time holding unit 132 holds the execution time of the new program provided by the user to the program registration unit 114. In addition, a relative cutoff time holding unit 134 is connected to the program registration unit 114. The relative cutoff time holding unit 134 holds the relative cutoff time of the new program provided by the user to the program registration unit 114.

The program response time estimating apparatus 100 is further provided with a program execution plan registration unit 116. When registering a new program at the program registration unit 114, the user provides the program execution plan registration unit 116 with information indicating when the new program is to be executed. Namely, the user provides the execution plan registration unit 116 with a set of information comprising program identification and the time point at which the program enters an execution wait state. It is to be noted that the time point at which the program enters an execution wait state is not necessarily a one time occurrence but it may occur cyclically.

An execution plan holding unit 136 is connected to the program execution plan registration unit 116. The set of information comprising the program identification and the time point at which the program enters an execution wait state provided by the user to the program execution plan registration unit 116 is then provided to the execution plan holding unit 136. As a result, the execution plan holding unit 136 holds sets of information each comprising a program identification and a time point at which the program enters an execution wait state, that correspond to all the programs already in operation in the system and the new program that has been added.

An average execution time calculation unit 138, an average execution request arrival interval calculation unit 140 and an average relative cutoff time calculation unit 142 are all connected to the execution plan holding unit 136.

The execution plan holding unit 136 provides the average execution time calculation unit 138 with the time points at which the individual programs enter an execution wait state (if there are a plurality of such time points in correspondence to a given program, the frequency with which the program enters an execution wait state is provided) which it holds. In addition, the execution time holding unit 132 provides the average execution time calculation unit 138 with the execution time information with regard to the added program which it holds. Based upon the information thus provided, the average execution time calculation unit 138 re-calculates the average value of the execution times of all the background programs when the new program is added.

The execution plan holding unit 136 provides the average execution request arrival interval calculation unit 140 with the time points at which the individual programs enter an execution wait state which it holds. The average execution request arrival interval calculation unit 140 calculates the length of time to elapse (frequencies) until the individual programs enter an execution wait state based upon the time points thus provided. When a new program is added, the average execution request arrival interval calculation unit 140 re-calculates the average value of the lengths of time (frequencies) to elapse before the individual programs enter an execution wait state for all the background programs. As a result, the average of the program execution request arrival intervals of all the background programs is re-calculated.

The execution plan holding unit 136 provides the average relative cutoff time calculation unit 142 with the frequencies with which the individual programs it holds enter an execution wait state. In addition, the relative cutoff time holding unit 134 provides the average relative cutoff time calculation unit 142 with the relative cutoff times of the individual programs it holds. Using the information thus provided, the average relative cutoff time calculation unit 142 re-calculates the average value of the relative cutoff times of all the background programs after the new program is added.

The response time calculation unit 170 is connected to the average execution time calculation unit 138, the average execution request arrival interval calculation unit 140 and the average relative cutoff time calculation unit 142.

The user of the response time estimating apparatus 100 sets the execution time and the relative cutoff time of the program to be added into the system at the estimation-undergoing program information receiving unit 112. The estimation-undergoing program information receiving unit 112 provides the execution time and the relative cutoff time of the estimation-undergoing program respectively to the estimation-undergoing program execution time holding unit 126 and the estimation-undergoing program relative cutoff time holding unit 128.

The response time calculation unit 170 calculates an estimated completion time of the estimation-undergoing program based upon the average value of the execution times of the individual background programs, the average value of the lengths of time to elapse before the background programs enter an execution wait state, the average value of the background program relative cutoff times, the execution time of the estimation-undergoing program and the relative cutoff time of the estimation-undergoing program. This calculation is performed as explained in reference to the first embodiment.

The response time calculation unit 170 provides the estimated response time indicator unit 180 with the estimated response time thus calculated. The estimated response time indicator unit 180, in turn, indicates the estimated response time to the user. Alternatively, it provides the estimated response time to the higher-order control apparatus in the system.

As explained above, the program response time estimating apparatus in the third embodiment extracts the execution frequencies of the individual programs and the length of time to elapse before the individual programs enter an execution wait state from the program execution plan. Thus, even in an environment where programs for execution change dynamically, the response time of a program can be determined within a short period of time as long as the execution time and the relative cutoff time of the program are known. It is not necessary to actually execute the program or to implement a simulation during this process.

By providing the program response time estimating apparatus in the third embodiment in a program processor that executes programs, for instance, an approximate response time of a new program to be added into the program processor can be ascertained without having to undergo a lengthy process. Then, after verifying that the response time of the new program is within the allowable range of the system, the new program can be actually introduced into the program processor.

It is not necessary for the user to obtain in advance the information to be provided to the program registration unit 114 or the estimation-undergoing program information receiving unit 112 through a statistical method or the like in the third embodiment, either. In addition, as explained earlier in reference to the first embodiment, the estimated response time indicator unit 180 may assume a structure which allows it to provide the estimated response time to another functional block in the system as well as indicating the response time of the estimation-undergoing program to the user.

Figure 6:
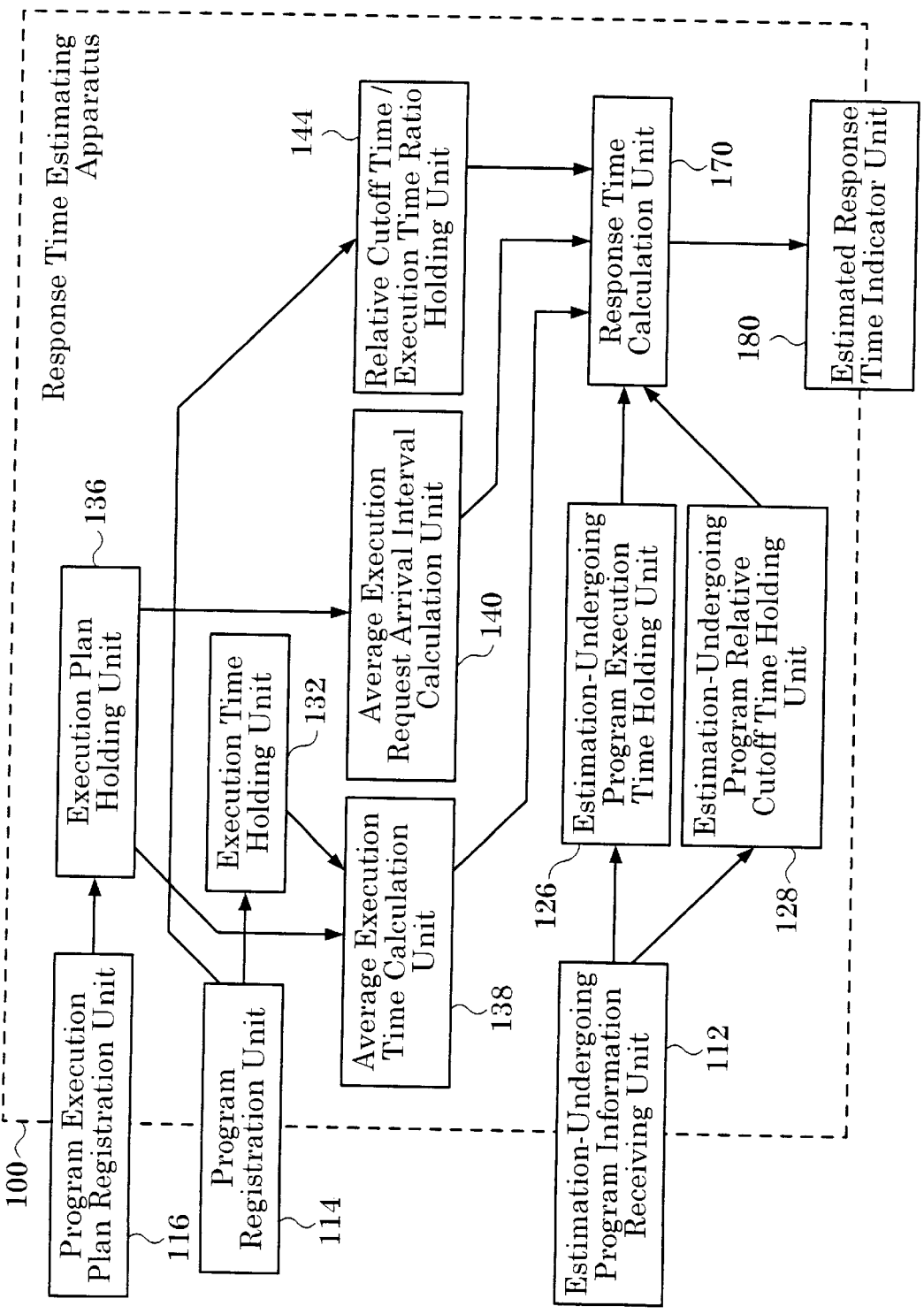
FIG. 6 is a block diagram of the program response time estimating apparatus in a fourth embodiment of the present invention.

Next, the fourth embodiment of the present invention is explained in reference to FIG. 6. FIG. 6 is a block diagram of the program response time estimating apparatus in the fourth embodiment of the invention. In FIG. 6, the same reference numbers are assigned to components identical to those in the block diagram in FIG. 5 to preclude the necessity for repeated explanation thereof.

The information provided by the user to the background program registration unit 114 in the fourth embodiment includes the execution time of a new background program to be added and the ratio of the relative cutoff time and the execution time of the new background program.

In the fourth embodiment, the program response time estimating apparatus 100 is provided with a relative cutoff time/execution time ratio holding unit 144. The relative cutoff time/execution time ratio holding unit 144 is connected to the program registration unit 114.

The following is an explanation of the operation performed in the fourth embodiment. The user of the response time estimating apparatus 100 first registers the execution time of the new background program to be added at the program registration unit 114. This execution time is then provided to the execution time holding unit 132. In addition, the user inputs a single relative cutoff time/execution time ratio applicable to all the background programs including the new program to the program registration unit 114.

The program registration unit 114 provides the execution time holding unit 132 with the program execution time thus input. It also provides the value representing the cutoff time/execution time ratio to the relative cutoff time/execution time ratio holding unit 144.

Next, the user provides the program execution plan registration unit 116 with information regarding when the program that has been registered at the program registration unit 114 is to be executed, i.e., information comprising the program identification and the time point (frequency) at which the program enters an execution wait state. The information comprising the program identification and the time point at which it enters an execution wait state is stored at the execution plan holding unit 136.

When a new program is added, the average execution time calculation unit 138 re-calculates the average value of the execution times of all the background programs. Then, the execution plan holding unit 136 provides the average execution request arrival interval calculation unit 140 with the time points at which the individual programs enter an execution wait state which it holds. Based upon the time points thus provided, the average execution request arrival interval calculation unit 140 calculates the lengths of time (frequency) to elapse before the individual programs enter an execution wait state. When a new program is added, the average execution request arrival interval calculation unit 140 re-calculates the average value of the lengths of time (frequencies) each representing the interval to elapse until each of the background programs enters an execution wait state. As a result, the average of the execution request arrival intervals of all the background programs is re-calculated.

The response time calculation unit 170 calculates an estimated completion time of the estimation-undergoing program based upon the average value of the execution times of the background programs, the average value of the lengths of time to elapse before the individual background programs enter an execution wait state, the average value of the relative cutoff time/execution time ratios of the background programs, the execution time of the estimation-undergoing program and the relative cutoff time of the estimation-undergoing program. This calculation is performed as explained in reference to the second embodiment.

As explained above, the program response time estimating apparatus in the fourth embodiment, too, extracts the execution frequencies of the individual programs and the lengths of time to elapse before the programs enter an execution wait state from the program execution plan. Even in an information processing system in which cutoff time points are set for program execution, the cutoff times may be set approximately in the form of ratios relative to the program execution times instead of setting strict cutoff time points for the individual programs.

In such a case, the response time of a program can be ascertained without necessitating a lengthy process by adopting the fourth embodiment as long as the program execution time is known, even when the programs are executed in an environment where the programs being executed change dynamically, the relative cutoff time is not set for each of the individual background programs and only a relative cutoff time/execution time ratio that is applicable to all the background programs is known.

By providing the program response time estimating apparatus in the fourth embodiment in a program processor that executes programs, for instance, an approximate response time of a new program to be added into the program processor can be ascertained within a short period of time.

Then, after verifying that the response time is within the allowable range for the system, the new program can actually be added into the program processor.

As has been explained, by employing the response time estimating apparatus according to the present invention, the response time of a program can be estimated without necessitating a lengthy process such as an actual or simulated execution of the program in a system adopting execution sequence control through which programs are executed in the order of their cutoff times, based upon the average value of the intervals to elapse before the individual programs present in the system enter an execution wait state, the average value of the execution times of the programs and the average value of the relative cutoff times of the programs and the execution time and the relative cutoff time of the program whose response time is to be estimated.

By installing the response time estimating apparatus according to the present invention in a system, the system user is able to ascertain the response time of an estimation-undergoing program easily and the utilization of the estimated response time in the overall control of the system is facilitated.

The entire disclosure of Japanese Patent Application No. 11-84044 filed on Mar. 26, 1999 including specification, claims, drawings and summary is incorporated herein by reference in its entirety.

What is claimed is:

1. A program response time estimating apparatus, wherein the response time calculation unit performs the estimation based on the following equation:

$$\left(1 - \frac{mE}{mA}\right)t - \frac{mE}{mA}e^{-y/mD}\{(y+2mD)(1-e^{t/mD}) + te^{t/mD}\} = x \quad (1)$$

and the response time of the estimation-undergoing program can be calculated through the following equation (2):

$$t + \frac{mE}{mA}\{mD - (mD+y)e^{-y/mD}\}, \quad (2)$$

wherein t represents the solution of expression (1), mA represents the background program average arrival interval, mE represents the background program average execution time, mD represents the background program average relative cutoff time, x represents the estimation-undergoing program execution time and y represents the relative cutoff time of the estimation-undergoing program.

2. A program response time estimating apparatus according to claim 1, wherein the response time calculation unit performs the estimation based on the following equation:

$$\left(1 - \frac{mE}{mA}\right)t - \frac{mE}{mA}e^{-y/mD}\{(y+2mD)(1-e^{t/mD}) + te^{t/mD}\} = x \quad (1)$$

and the response time of the estimation-undergoing program can be calculated through the following equation (2):

$$t + \frac{mE}{mA}\{mD - (mD+y)e^{-y/mD}\}, \quad (2)$$

wherein t represents the solution of expression (1), mA represents the background program average arrival interval, mE represents the background program average execution time, mD represents the background program average relative cutoff time, x represents the estimation-undergoing program execution time and y represents the relative cutoff time of the estimation-undergoing program.

3. A program response time estimating apparatus according to claim 1, wherein the response time calculation unit performs the estimation based on the following equation:

$$\left(1 - \frac{mE}{mA}\right)t - \frac{mE}{mA}e^{-Y/(\alpha mE)}\{(y + 2\alpha mE)(1 - e^{1/(\alpha mE)}) + te^{1/(\alpha mE)}\} = x \quad (3)$$

and the response time of the estimation-undergoing program can be calculated through the following equation (4):

$$t + \frac{mE}{mA}\{\alpha mE - (\alpha mE + y)e^{-y/(\alpha mE)}\} \quad (4)$$

wherein t represents the solution of equation (3), with mA representing the background program average arrival interval, mE representing the background program average execution time, α representing the background program relative cutoff time/execution time ratio, x representing the estimation-undergoing program execution time and y representing the relative cutoff time of the estimation-undergoing program.

4. A program response time estimating apparatus according to claim 1, wherein the response time calculation unit performs the estimation based on the following equation:

$$\left(1 - \frac{mE}{mA}\right)t - \frac{mE}{mA}e^{-Y/(\alpha mE)}\{(y + 2\alpha mE)(1 - e^{1/(\alpha mE)}) + te^{1/(\alpha mE)}\} = x \quad (3)$$

and the response time of the estimation-undergoing program can be calculated through the following equation (4):

$$t + \frac{mE}{mA}\{\alpha mE - (\alpha mE + y)e^{-y/(\alpha mE)}\} \quad (4)$$

wherein t represents the solution of equation (3), with mA representing the background program average arrival interval, mE representing the background program average execution time, α representing the background program relative cutoff time/execution time ratio, x representing the estimation-undergoing program execution time and y representing the relative cutoff time of the estimation-undergoing program.

* * * * *